ISAAC CHURCH AND LE ROY MONTGOMERY.
EXPANSION BOLT.
APPLICATION FILED JAN. 17, 1921.
1,407,782.
Patented Feb. 28, 1922.
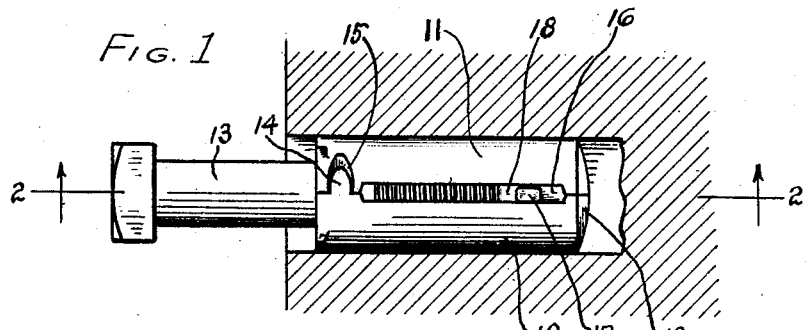
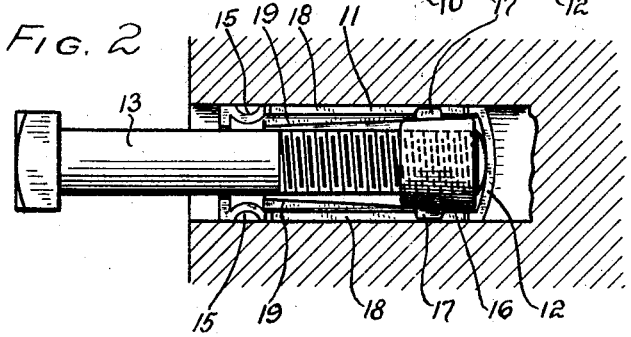
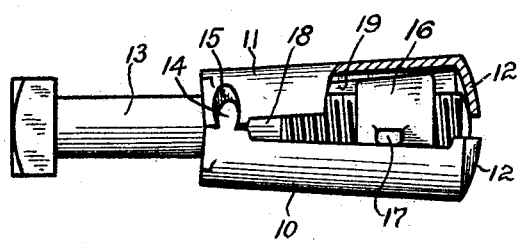
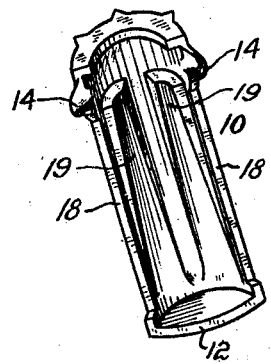
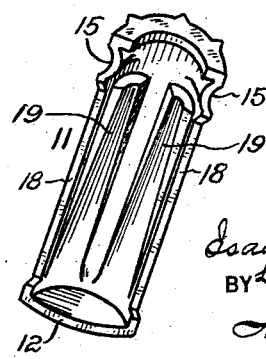
INVENTORS
Isaac Church and
BY LeRoy Montgomery
ATTORNEY

UNITED STATES PATENT OFFICE.

ISAAC CHURCH AND LE ROY MONTGOMERY, OF NORWALK, CONNECTICUT, ASSIGNORS TO THE ISAAC CHURCH EXPANSION BOLT COMPANY, OF EAST NORWALK, CONNECTICUT, A CO-PARTNERSHIP.

EXPANSION BOLT.

1,407,782.   Specification of Letters Patent.   Patented Feb. 28, 1922.

Application filed January 17, 1921. Serial No. 437,661.

*To all whom it may concern:*

Be it known that we, ISAAC CHURCH and LE ROY MONTGOMERY, citizens of the United States, residing at Norwalk, county of Fairfield, State of Connecticut, have invented an Improvement in Expansion Bolts, of which the following is a specification.

Our invention relates to the class of bolts which are designed to secure various objects to stone and brick walls and for like purposes, being of the class commonly known as "expansion bolts." The expansion bolt shown herein is in some respects similar to that illustrated in patent to Isaac Church, No. 777,399, granted December 13, 1904, and is an improvement on the expansion bolt of said patent.

The present invention relates more particularly to an expansion bolt comprising a two-part cylindrical shell, having internal ribs inclined from back to front, an oppositely inclined nut movable in the shell, and a bolt threaded through the nut, which when drawn toward the front of the shell will expand the shell and force its outer surfaces into contact with the walls of the hole in which it is to be secured. It is preferable that the outside of the shell be made smooth to afford maximum frictional engagement with the walls of the hole, but a roughened or corrugated surface may be used if preferred. The inner end of the shell is formed with rigid webs which close the end of the shell and provide an abutment against which the bolt may bear, thus causing the nut to travel along the threads of the bolt as soon as the contact is effected.

The essential feature of the invention is that we provide the shell with a cylindrical outer surface and with inclined ribs on the inner surface, against which the sliding nut may act. The number of ribs formed on the parts of the shell is immaterial, two ribs on each part having been found to provide ample contact surface for the nut. With this construction we produce an expansion bolt having a shell which is very light in weight, yet retaining all the advantages of the heavier shells heretofore used in expansion bolts, and making it possible to market the article at a minimum cost.

With the above and other objects in view we have devised the novel expansion bolt which will now be described in detail, referring to the accompanying drawing forming a part of this specification, and using reference characters to indicate the several parts.

Fig. 1 is a side view of our novel expansion bolt located within an aperture in a structure in which it is to be secured, the structure being in section;

Fig. 2, a longitudinal sectional view taken on the line 2—2 in Fig. 1, looking in the direction of the arrows, showing the bolt and nut in elevation;

Fig. 3, a side view of our novel expansion bolt, one part of the shell being broken away to show the manner in which the nut contacts with the inclined ribs; and Figs. 4 and 5 are perspective views of the two parts of the shell respectively, showing the inclined ribs on the interior surfaces of the parts.

10 and 11 denote the parts of the shell of an expansion bolt, preferably formed of malleable cast-iron, although they may be otherwise formed if preferred. The parts are formed with a semi-circular outer surface so that when placed together they form a cylindrical shell, the inner ends being formed with webs 12, which close the end of the shell when assembled and provides an abutment for bolt 13 to bear against, as will presently be described. On the other ends of the parts of the shell we provide suitable means for holding them together in assembled relation ready for use, such as a pair of projecting lugs 14 on the part 10, which enter grooves 15 in part 11. The lugs are bent down into the grooves to hold the parts together and prevent disassembling when not in use. 16 denotes an inclined nut, adapted to be positioned within the shell, which is internally screw threaded to receive bolt 13, and which is formed with two diametrically opposite lugs or guides 17 adapted to move in slots 18 formed by cutting away metal from the edges of the parts 10 and 11 of the shell. The shell is assembled with the nut inside at the inner end adjacent the webs 12. It will be apparent in use, when the bolt 13 is screwed through the nut and abuts against the webs, that further rotation of the bolt will cause the nut to travel along the threads of the bolt toward the outer end of the shell and thus expand the shell.

Each of the parts of the shell is formed with ribs 19, inclined from the back to front upon which the oppositely inclined nut is adapted to slide. It is found by forming the parts of the shell with a relatively thin outer wall and providing ribs on the inner surface that the weight of the shell is greatly reduced, thus lowering the cost of manufacture to the minimum. While we have shown in the drawing two inclined ribs on each part of the shell, the invention contemplates the provision of more or less than two ribs as may be found practicable.

It will be seen therefore that we have accomplished the objects primarily stated and that we produce an expansion bolt having a shell which is very light in weight, is easy to cast, and does not require machining.

Having thus described our invention, we claim:

An expansion bolt comprising two shell-like members of semi-circular cross section having approximately parallel inner and outer surfaces and substantially free of external depressions, said members being arranged edge to edge, whereby a cylindrical casing is provided, of uniform diameter throughout its length when in use, said members having means to provide an abutment wall closing one end of the casing, said members also having complemental means to prevent relative longitudinal displacement, each of said members having an internal tapered rib, a threaded bolt having one end bearing against the abutment wall, and a nut working on said bolt and engaging said ribs.

In testimony whereof we affix our signatures.

ISAAC CHURCH.
LE ROY MONTGOMERY.